United States Patent [19]

Cline et al.

[11] Patent Number: 4,985,834

[45] Date of Patent: * Jan. 15, 1991

[54] SYSTEM AND METHOD EMPLOYING PIPELINED PARALLEL CIRCUIT ARCHITECTURE FOR DISPLAYING SURFACE STRUCTURES OF THE INTERIOR REGION OF A SOLID BODY

[75] Inventors: Harvey E. Cline; Richard I. Hartley, both of Schenectady; Siegwalt Ludke, Scotia; Sharbel E. Noujaim, Clifton Park, all of N.Y.

[73] Assignee: General Electric Company, Schenectady, N.Y.

[*] Notice: The portion of the term of this patent subsequent to Jan. 12, 2005 has been disclaimed.

[21] Appl. No.: 275,154

[22] Filed: Nov. 22, 1988

[51] Int. Cl.⁵ .............................................. G06F 15/42
[52] U.S. Cl. .......................... 364/413.22; 364/413.19
[58] Field of Search ..................... 364/413.13–413.26, 364/413, 22, 413.19

[56] References Cited

U.S. PATENT DOCUMENTS

| | | | |
|---|---|---|---|
| 4,594,673 | 6/1986 | Holly | 364/521 |
| 4,622,634 | 11/1986 | Fidel | 364/413.25 |
| 4,674,046 | 6/1987 | Ozeki et al. | 364/522 |
| 4,688,175 | 8/1987 | Kaneko et al. | 364/413.22 |
| 4,691,366 | 9/1987 | Fenster et al. | 364/413.23 |
| 4,709,332 | 11/1987 | Morrison et al. | 364/413.23 |
| 4,710,876 | 12/1987 | Cline et al. | 364/313 |
| 4,719,585 | 1/1988 | Cline et al. | 364/518 |
| 4,729,098 | 3/1988 | Cline et al. | 364/414 |
| 4,751,643 | 6/1988 | Lorensen et al. | 364/414 |
| 4,821,210 | 4/1989 | Rumbaugh | 364/522 |
| 4,821,213 | 4/1989 | Cline et al. | 364/413.13 |
| 4,850,027 | 7/1989 | Kimmel | 364/133 |

OTHER PUBLICATIONS

J. D. Foley et al., *Fundamentals of Interactive Computer Graphics,* pp. 225–261, Addison-Wesley Publishing Co., Reading Mass., 1982.

*Primary Examiner*—Michael R. Fleming
*Assistant Examiner*—Gail O. Hayes
*Attorney, Agent, or Firm*—Marvin Snyder; James C. Davis, Jr.

[57] ABSTRACT

Arbitrary interior surfaces of a three-dimensional body are displayed from a regular array of values of at least one physical property in the interior of the body. The physical property measurements may be made with systems such as computerized tomographic x-ray, or magnetic resonance imaging. Highly parallel circuits and a highly parallel architecture permit generation of surface views in real time, i.e., sufficiently fast to support ongoing procedures such as surgical operations. These parallel circuits, realizable on large scale integrated circuit chips, perform surface normal calculations, linear interpolations and signal comparisons in simultaneously operating circuit paths which are asynchronously enabled when input data appear.

22 Claims, 6 Drawing Sheets

SYSTEM AND METHOD EMPLOYING PIPELINED PARALLEL CIRCUIT ARCHITECTURE FOR DISPLAYING SURFACE STRUCTURES OF THE INTERIOR REGION OF A SOLID BODY

TECHNICAL FIELD

This invention relates to display systems and, more particularly, to the rapid display of the interior surface structures of solid bodies for which values of physical properties are available at regular grid positions within the interior of such bodies.

BACKGROUND OF THE INVENTION

It is well known to obtain three-dimensional arrays of data representing one or more physical properties at regular grid positions within the interior of solid bodies. Such data can be obtained by non-intrusive methods such as computed axial tomographic (CAT) x-ray scanning systems, by nuclear magnetic resonance (NMR) imaging systems, or by other non-intrusive mechanisms such as ultrasound, positron emission tomography (PET), emission computed tomography (ECT) and multimodality imaging (MMI). Each of these techniques produces a planar, grid-like array of values for each of a succession of slices of the solid object, thus providing a three-dimensional array of such values. Typically, the solid object is a human body or a portion thereof, although the method is equally applicable to other natural or artificial bodies. In the case of CAT scanning, the physical value would be the coefficient of x-ray absorption. For NMR imaging, the physical value would be the spin-spin or the spin-lattice relaxation time. In any event, the measured physical values reflect the variations in composition, density or surface characteristics of the underlying physical structures. Such a three-dimensional data array typically consists of a plurality of sets of three-dimensional (x,y,z) coordinates distributed at regular positions in a cubic or parallelepiped lattice within the body, and at least one value ($V_{xyz}$) of the physical property being associated with each respective one of the coordinate positions. Each cubically adjacent set of eight such positions defines a cubic volume called a "voxel" with a physical property value being specified for each of the eight voxel vertices. In turn, each voxel "neighborhood" includes the voxel itself and the immediately adjacent six voxels which share a common face; thus, a voxel neighborhood is a cubic volume including seven voxels having 32 physical values associated with the voxel vertices.

It is likewise known to utilize such three-dimensional arrays of interior physical values to generate visual images of the interior structures within the body. In the case of the human body, the visual images thus produced can be used for medical purposes such as diagnostics or for the planning of surgical procedures. In order to display two-dimensional images of such three-dimensional interior structures, however, it is necessary to locate the position of the surface of such structure within the array of physical values. This is accomplished by comparing the array values to a single threshold value, or to a range of threshold values, corresponding to the physical property values associated with that surface. Bones or any other tissue, for example, can be characterized by a known range of density values to which the array values can be compared. Once the surface location is determined, this surface must be shaded so as to give the human eye the correct impression of the shape and disposition of that surface when it is displayed on a two-dimensional display device. To provide such shading, the angular direction of a vector normal or orthogonal to the surface at each point on the surface is compared to the viewing angle of the observer. The intensity of shading can then be adjusted so as to be proportional to the difference between these angles. Such angular difference information can also be used to control the colors incorporated in the displayed images, thus providing yet another visual clue to the surface disposition. Normal vectors with components directed away from the viewing angle can be ignored since the associated surfaces are hidden from view.

One method for approximating the surface of an internal structure is the so-called "marching cubes" method, disclosed in H. E. Cline et al. U.S. Pat. No. 4,710,876, granted Dec. 1, 1987, and assigned to applicants' assignee. In this method, the surface segment intersecting a voxel is approximated by one of a limited number of standardized plane polygonal surfaces intersecting the voxel. One particular standardized surface is selected by a vector representing the binary differences between the threshold value and the eight voxel vertex values. The surface-to-voxel intersection coordinates, as well as the normal vector, for each such standardized polygonal surface set can then be calculated or obtained by table look-up techniques. The final surface is assembled as a mosaic, using all of the standardized polygons as tessera or tiles. Appropriate intensity values derived from the normal vector angles can be displayed immediately for viewing, or stored for later display. H. E. Cline et al. U.S. Pat. No. 4,729,098, granted Mar. 1, 1988, and also assigned to applicants' assignee, shows a variation of the marching cubes method using nonlinear interpolation to locate more accurately the coordinates of the tessellated standardized polygons.

Another method for approximating the surface of an internal structure is the so-called "dividing cubes" method, disclosed in H. E. Cline et al. U.S. Pat. No. 4,719,585, granted Jan. 12, 1988, and also assigned to applicants' assignee. In this method, the values at the vertices of the voxel are used to interpolate, in three dimensions, values at regularly positioned intra-voxel sub-grid locations. These interpolated sub-grid values can then be used to locate the surface position more precisely and to calculate the normal vector more accurately. The present invention is an extension of, and improvement on, the dividing cubes method of approximating surface locations and surface normals.

In order to distinguish between different internal structures with the same or similar physical property values, W. E. Lorensen et al. U.S. Pat. No. 4,751,643, granted Jun. 14, 1988, and likewise assigned to applicants' assignee, discloses a technique for labeling surfaces with similar property values and using adjacency criteria with respect to a "seed" location in the particular structure of interest to segregate the desired surface from all of the labeled surfaces. The copending application of H. E. Cline et al., Ser. No. 907,333, filed Sept. 15, 1986, also assigned to applicants' assignee, discloses another technique of segregating similar structures by determining connectivity from adjacent information. Copending application Ser. No. 943,357, filed Dec. 19, 1986, for H. E. Cline et al., also assigned to applicants' assignee, discloses yet another technique for differentiating internal structures in which a linear pass is made through the data array to locate and label all of the different structures along the scan line by counting structure interfaces.

Thus it is known to use a single array of values of a physical property within the interior of a solid body to generate perspective images of arbitrarily selected internal structures within the body, seen as if viewed from arbitrarily chosen viewing angles, all by manipulating the selfsame single array of values. Unfortunately, the amount of processing necessary to produce a single image in this way is so large that it has heretofore been difficult to produce images fast enough to keep pace with many ongoing procedures. Moreover, the need for real time, interactive generation of such images to support ongoing medical or surgical procedures is increasing as the complexity and delicacy of surgical procedures has increased in the recent past. Organ transplants, heart bypass surgery and cosmetic surgery have all increased in complexity and precision as the boundaries of medical knowledge have expanded. There is therefore a growing need for large numbers of real time three-dimensional images, generated as needed in the course of ongoing surgery.

Accordingly, one object of the invention is to provide a method of, and apparatus for, generating real time, two-dimensional perspective images of structures within a three-dimensional body, seen as if viewed from arbitrarily chosen viewing angles.

Another object of the invention is to provide a highly parallel, pipelined processor capable of generating, at a relatively rapid rate, images of internal structures of a three-dimensional body.

Another object of the invention is to provide a method and apparatus for interactively generating real time, two-dimensional perspective images of three-dimensional structures within a body.

SUMMARY OF THE INVENTION

In accordance with the illustrative embodiment of the present invention, perspective two-dimensional images of interior surfaces are produced from three-dimensional regular arrays of physical values by a highly parallel, pipelined processor which generates images of the internal structures of a three-dimensional body sufficiently rapidly to keep pace with on-going surgical procedures. More specifically, the three-dimensional data is stored in a multi-bank memory such that a "voxel" of data can be accessed in parallel. Data from a plurality of such voxels in the neighborhood of a single voxel of interest are processed simultaneously by two parallel paths, one to establish the location of the surface to be displayed, and the other to determine the level of shading at the associated location on the surface. A particular surface of interest can be selected by a threshold constant representing the value of the physical constant associated with the surface of interest. In order to identify the intersecting voxels, the voxel vertex values are accessed, one set at a time, in parallel, from a memory containing the three-dimensional data. Each set of voxel vertex values thus accessed is compared to this constant to identify those voxels intersecting the surface of interest. Non-intersecting voxels are discarded and the next voxel accessed. For each intersecting voxel found in this manner, the data values associated with the "neighborhood" of voxels are accessed to permit calculation of the surface normal values. The "neighborhood" of a voxel is the six facially abutting voxels in the 3×3 voxel volume surrounding and abutting the voxel. For each intersecting voxel, and only for intersected voxels, the direction of the vector perpendicular to the surface (the surface normal value) is calculated for each of the voxel vertices. The intersected voxel is then subdivided by preselected scale factors into sub-voxel cubes and the sub-voxel vertex values are interpolated by linear interpolation to more precisely locate the surface intersections with the sub-voxel cubes. To this end, the sub-voxel vertex values are compared to the surface constant and the intersecting sub-voxel cubes identified. A single point (e.g., the center) of the sub-voxel cube is deemed to be on the surface of interest. This point of interest on the surface, expressed in x,y,z coordinates, is used to perform a three-dimensional interpolation between the voxel vertex normals to obtain the normal angle at the surface point thus identified. Conventional graphical display means are then used to select the viewing angle and viewing depth, to translate the surface coordinates and normal values to a two-dimensional view of the surface, and to display the surface on a cathode ray tube screen.

An important feature of the present invention is the highly parallel nature of the processing taking place in the surface-locating and normal-calculating portions of the processor. Moreover, only those voxels and sub-voxels containing surface intersections need be processed, thus substantially reducing the amount of processing required. Finally, since voxel and sub-voxel comparisons need never take place simultaneously, the comparison circuitry can be time-shared by these two comparisons without slowing down the operation of the processor. The highly parallel processing and the use of a pipeline architecture permit real-time generation of internal surface structures, allowing these surface displays to be used in support of ongoing procedures. Once surface points for the surface of interest have been accumulated for the entire surface, they may then be arbitrarily rotated to any viewing orientation and cut in the space of the data or in the space of the viewer by manipulating these surface points.

The resolution of the final image is controlled by selecting the sub-voxel scaling factors to exactly match the resolution capacity of the display device, thus taking full advantage of the resolution capability of the display device.

BRIEF DESCRIPTION OF THE DRAWINGS

A complete understanding of the present invention may be gained by considering the following detailed description in conjunction with the accompanying drawings, in which:

FIG. 9 is a detailed block diagram of a three-dimensional linear interpolator circuit useful in the processing system of FIG. 3;

To facilitate reader understanding, identical reference numerals are used to designate elements common to the figures.

DETAILED DESCRIPTION

In the present invention, a sequence of voxel elements is used to locate the intersection of a surface of interest with the voxels. A "voxel" in this connection is a three-dimensional parallelepiped defined by an array of data values representing physical values measured in the interior of a solid body by non-intrusive means. In accordance with the present invention, data from consecutive NMR or CAT scan slices are assembled into a three-dimensional array of values which can then be analyzed or processed to obtain two-dimensional images of the three-dimensional information. The generation of such three-dimensional interior data arrays is well known in the art and will not be further described here. It is sufficient to note that such data arrays are readily obtainable by well-known, non-intrusive methods such as computed axial tomographic (CAT) x-ray scanning systems, nuclear magnetic resonance (NMR) imaging systems, ultrasound scanning, positron emission tomography (PET), emission computed tomography (ECT) and multimodality imaging (MMI). Such methods produce planar arrays of data points, one planar array being at each of a regular succession of adjacent "slices" through the solid body being scanned. Taken together, this succession of slices forms the three-dimensional array of data values.

Figure 1:
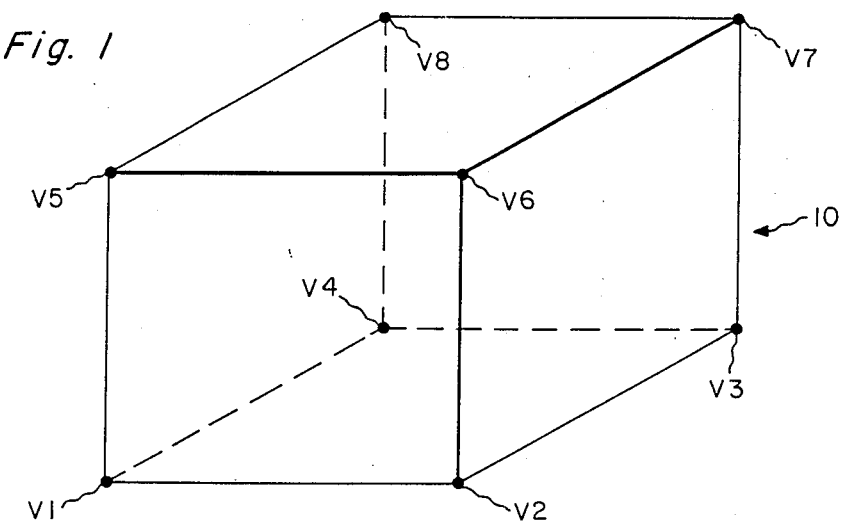
FIG. 1 is a perspective view illustrating a single voxel element defined by eight grid locations in an array of physical values obtained by non-intrusive means, useful in explaining operation of the present invention.

The array nature of such data values can be seen in FIG. 1, which illustrates a single voxel element 10 with vertices V1 through V8. Each voxel element, like element 10, spans two successive slices of data values. Associated with each vertex V1–V8 of voxel element 10 is a data value which represents the measurement of at least one physical property which is associated with the corresponding spatial position within the three-dimensional body. The spatial positions are located in regular patterns defining regularly spaced grid locations within the body. The grid positions, in turn, define a plurality of adjacent voxels like voxel 10.

In accordance with the present invention, the data array is stored, accessed and processed in a highly parallel, pipeline circuit architecture in order to generate visual displays of the internal structures of the solid body in real time, i.e., sufficiently rapidly to be of assistance in ongoing surgical or other procedures in which a knowledge of such internal structures is of paramount importance.

A brief summary of the procedure involved in the present invention is as follows:

1. Obtain and store the three-dimensional array of physical values by non-intrusive means such as CAT scan or NMR imaging.

2. Access the three-dimensional array of data one voxel (8 data values) at a time and in a regular succession.

3. Compare the voxel vertex values of the current voxel with a constant representing the surface of interest.

4. If the surface of interest does not intersect this voxel, as determined by step (3), access the next voxel of data values and repeat step (3).

5. If the surface of interest does intersect this voxel, retrieve the neighborhood values (24 data values) and use these values to compute the normal values at the intersected voxel vertices by finite differences.

6. Subdivide the intersected voxel, using the dividing cubes method, into sub-voxels of small enough size to take full advantage of the resolution capability of the display device.

7. For each sub-voxel so defined, interpolate the physical data values for each sub-voxel vertex, using the voxel vertex data values and linear interpolation.

8. Compare the sub-voxel vertex values, one sub-voxel at a time, to the constant representing the surface of interest.

9. If the surface of interest does not intersect this sub-voxel, go to the next sub-voxel in the intersected voxel and repeat step (8).

10. If the surface of interest does intersect this sub-voxel, utilize the coordinates of the sub-voxel as the coordinates of a point on the surface of interest.

11. Using these sub-voxel coordinates, perform a three-dimensional linear interpolation of the normal values calculated for the voxel in step (5).

12. Store the surface coordinates and the value of the normal vector, as obtained in steps (10) and (11), in a display list and return to step (8) until all of the sub-voxels have been tested.

13. When all of the sub-voxels of the current intersected voxel have been tested in step (8), return to step (2) to access the next voxel in the array. When all of the voxels have been tested, terminate the voxel scanning procedure of step (2).

14. Project the surface location coordinates stored in the display list in step (12) onto a viewing plane determined by the angle and depth of viewing.

15. Select cutting planes to limit both the surface of interest and the viewing window, and filter the viewing plane coordinates accordingly.

16. Calculate the intensity (or color) of the display at each projected and filtered surface location by comparing the viewing angle with the normal angle value at that surface location.

17. Display, at the picture coordinates filtered in step (15), and at an intensity level calculated in step (16) at the projected surface coordinates, on a display device.

This procedure will be described in more detail in connection with the balance of the figures.

As noted above, FIG. 1 discloses a single voxel. In order to calculate normal values, however, neighborhood voxel vertex values are required. The various neighborhood physical values, and their coordinate positions relative to the voxel vertices can be better seen in FIG. 2.

Figure 2:
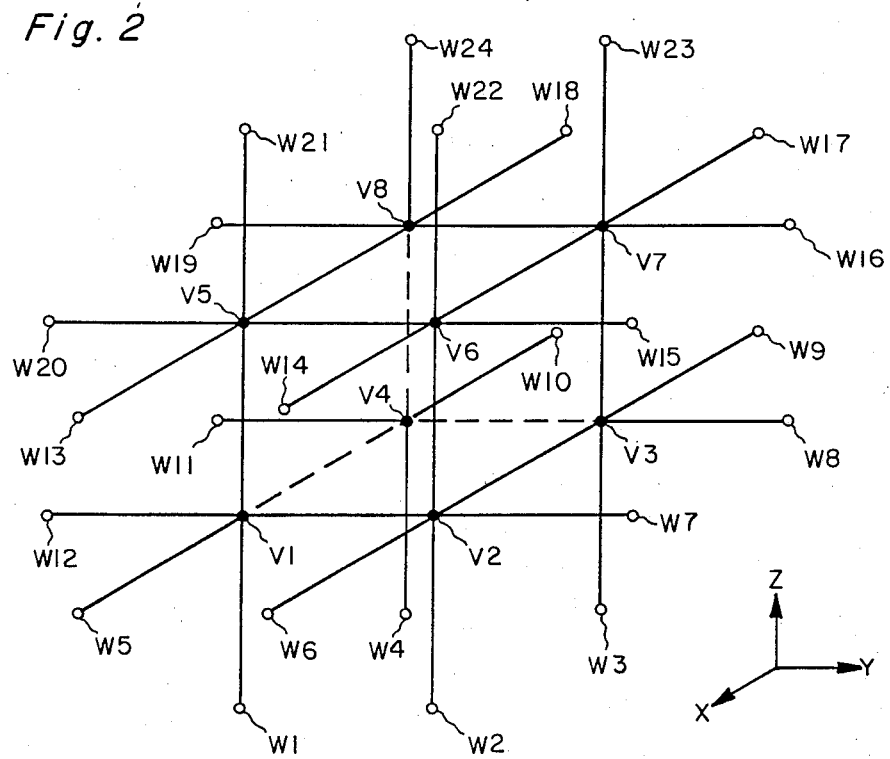
FIG. 2 is a perspective view of a voxel neighborhood, illustrating the neighborhood values required to calculate normal values for the eight grid locations defining the voxel volume, and is also useful in explaining operation of the present invention.

FIG. 2 illustrates a single voxel element with vertices V1 through V8. As noted above, each voxel element spans two adjacent slices of the information array. Associated with each vertex point is a number representing the measured physical property value of the three-dimensional body at that location. The eight cubically adjacent grid locations define the volume element called a voxel. Associated with each of the eight voxel vertices V1 through V8 are three adjacent grid locations lying along projections of the voxel edges. Together, these "near neighbor" grid locations, identified as locations W1-W24, define a voxel neighborhood. There are 24 data points of near neighbors. In FIG. 2, the voxel vertices V1-V8 are shown as filled circles while the neighborhood data points W1-W24 are shown as open circles. The data values of interest with respect to each voxel (V1-V8 and W1-W24) occupy four adjacent data slices. In the system and method of the present invention, these 32 data values are used to compute the normal vectors at the vertices of the voxel and, by interpolation, at points on a surface within the voxel. These normal vectors are computed using finite difference methods and, in particular, the central difference method. More particularly, to compute the x component of the normal vector at vertex V1, the difference between data values at grid locations V4 and W5 is taken. In a like manner, the z component of the normal vector associated with vertex V1 may be computed as the difference between the data values at grid locations V5 and W1. Lastly, the y component of the normal vector associated with vertex V1 is generated as the difference between the data values at grid locations V2 and W12. The resulting vector formed from the differences is then scaled to unit magnitude by dividing each vector component by the square root of the sum of the squares of all of the vector components.

Figure 3:
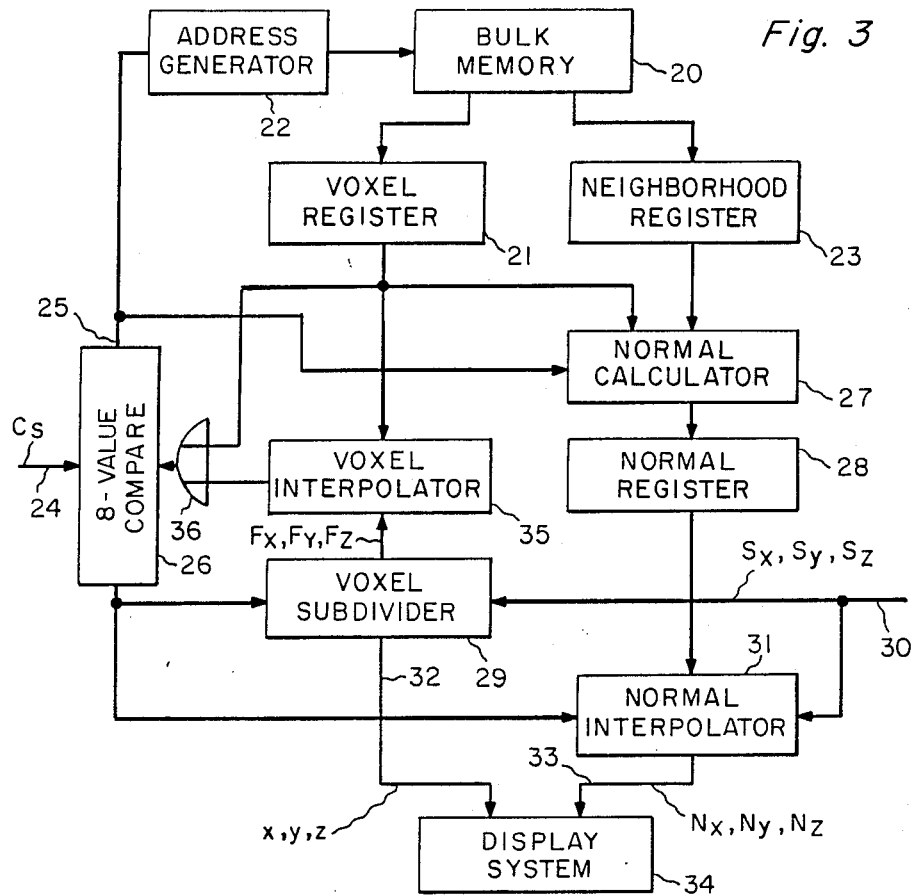
FIG. 3 is a general block diagram of a processing system in accordance with the present invention for generating images of three-dimensional surfaces in real time.

FIG. 3 illustrates, in schematic form, a block diagram of a system in accordance with the present invention. A bulk memory 3-D data store 20 stores the array of values of a physical property obtained by CAT scanning or NMR scanning techniques. Store 20 is comprised, in the illustrative embodiment, of a plurality of banks of RAM memory. Thus, at each access, a plurality of values is transferred to voxel data store or register 21. The addresses in the banks of store 20 correspond to the coordinates of the voxels for successive voxels. Thus a single address in address generator 22 serves to transfer an entire voxel of data values (eight values as defined in FIG. 1) from store 20 to voxel register 21. As will be discussed in connection with FIG. 4, address generator 22 may comprise x, y and z counters, the counts of which, when taken together, comprise a voxel address in memory 20. These counters are initially set to the $x=1$, $y=1$, $z=1$ voxel. Each time generator 22 is advanced, the x count is advanced, up to the maximum x dimension of the data array in voxels. At the edge of the data space, the x count is reset to one and the y count is incremented by one. When the y count reaches the edge of the data space in voxels, the y count is reset to one and the z count incremented by one. In this way, the entire data space is scanned in a regular manner, one voxel at a time.

The eight data points representing grid positions V1-V8 are stored in voxel store 21 and applied through OR gate 36 to 8-value compare circuit 26. Compare circuit 26 will be described in detail in conjunction with FIG. 5. Also applied to compare circuit 26 is a surface constant on leads 24. This surface constant on leads 24 corresponds to the value of the physical property associated with the surface which is to be displayed. If more than one surface has the same or a similar surface constant value, the aforementioned techniques of W. E. Lorensen et al. U.S. Pat. No. 4,751,643, granted Jun. 14, 1988, or of the applications of H. E. Cline et al., Ser. No. 907,333, filed Sept. 15, 1986, or Ser. No. 943,357, filed Dec. 19, 1986, may be used to isolate the surface of interest. Comparator 26 simultaneously compares the surface constant from leads 24 with the eight voxel vertex values V1-V8, stored in voxel register 21. If all of the voxel vertex values are greater than the surface constant, then the voxel is entirely outside of the surface of interest. If all of the voxel vertex values are less than the surface constant, then this voxel is entirely inside of the surface of interest. If the comparisons show any other result, the surface of interest intersects this voxel. Since only intersected voxels contribute to the surface image, if the voxel is not intersected, address generator 22 is advanced, via leads 25, to provide data from the next voxel for examination. Indeed, most surfaces intersect only a very small percentage of the voxels in the data array, and hence most voxels are not further considered after being tested in compare circuit 26.

If the surface of interest does intersect this voxel, further processing is in order. In that case, address generator 22 is signaled, via leads 25, to generate voxel addresses for the six closest neighbor voxels of the current voxel. That is, the x, y and z counters are, one at a time, temporarily incremented and decremented by unity to access the voxel vertex values of the six voxels sharing a common face with the voxel of interest. The twenty-four nearest neighbor voxel vertex values W1-W24 (illustrated in FIG. 2) taken from these neighbor voxels are stored in a neighborhood or near neighbor register 23. When all of the near neighbor vertex values W1-W24 have been accumulated in neighborhood register 23, they are applied to a normal vector calculator 27. Normal calculator 27 calculates and normalizes the x, y and z components of the normal vectors for each of the eight vertices of the voxel defined by the vertex values V1-V8, as will be described in conjunction with FIG. 6. These twenty-four normal vector values (three per voxel vertex) are stored in a normal register 28.

At the same time that normal calculator 27 is generating the vertex normal values, a voxel subdivider 29, enabled by compare circuit 26, divides the voxel into a plurality of sub-cubes by scale factors $S_x$, $S_y$, $S_z$, delivered by leads 30. These scale factors are selected to match exactly the resolution capability of the display device to be used. While separate scale factors can be provided for each dimension, the same scale factor can be used in all three dimensions. The scale factors are preferably binary (1, 2, 4, 8, etc.) to reduce the processing required in the circuit of FIGS. 3 and 7. As will be described in conjunction with FIG. 7, voxel subdivider 29 generates fractional vertex coordinates for each of the sub-voxel cube vertices. These fractional vertex coordinates are used in a voxel interpolator 35 to generate the sub-voxel vertex data values from the voxel vertex values in register 21. The fractional vertex coordinates are also used in a normal interpolator circuit 31 to generate the sub-voxel normal values for intersected sub-voxels. The sub-voxel vertex values derived by voxel interpolator circuit 35 are compared, one sub-voxel cube at a time, to the surface constant value in compare circuit 26, via an OR gate 36. As in the case of the voxels themselves, a sub-voxel cube intersection is identified by detecting that all of the sub-voxel vertex values are neither all greater than, nor all less than, the surface constant value. Voxel subdivider 29 scans through the sub-voxel cubes in much the same way that the voxels themselves are scanned through, looking for an intersecting sub-voxel. When an intersecting sub-voxel is found, the output of normal interpolator 31 is enabled to transfer the three-dimensional interpolation of the normal values in register 28 from interpolator 31 to a display system 34. The sub-voxel coordinates for the intersected sub-voxel are simultaneously supplied from voxel subdivider 29 on leads 32 to display system 34 in synchronism with the normal value at those coordinates on leads 33 from normal interpolator 31. Voxel subdivider 29 will be described in more detail in conjunction with FIG. 7, voxel interpolator circuit 35 will be described in more detail in conjunction with FIG. 9, and display system 34 will be described in more detail in conjunction with FIG. 10. Normal interpolator 31 is comprised of three interpolation circuits of the type shown in FIG. 9.

It will be noted that the entire procedure performed by the processing system illustrated in FIG. 3 is highly parallel. The surface locations and the surface normals are simultaneously calculated in parallel processing circuits. Moreover, the processing steps are performed in a pipeline, with each element in the pipeline receiving its input data from the preceding element in the pipeline, and delivering its output data to the succeeding element in the pipeline, without waiting for any operation other than delivery of data to its input. The various processes at different points in the pipeline are therefore carried on simultaneously, but on different, succeeding sets of values. As will be seen in the circuits of the remaining figures, the individual processes are themselves also highly parallel, thereby facilitating use of an overall processing system that is sufficiently fast to generate visual displays of the interior surfaces of a solid body in real time, so as to be of valuable assistance in support of ongoing procedures such as surgical operations.

Figure 4:
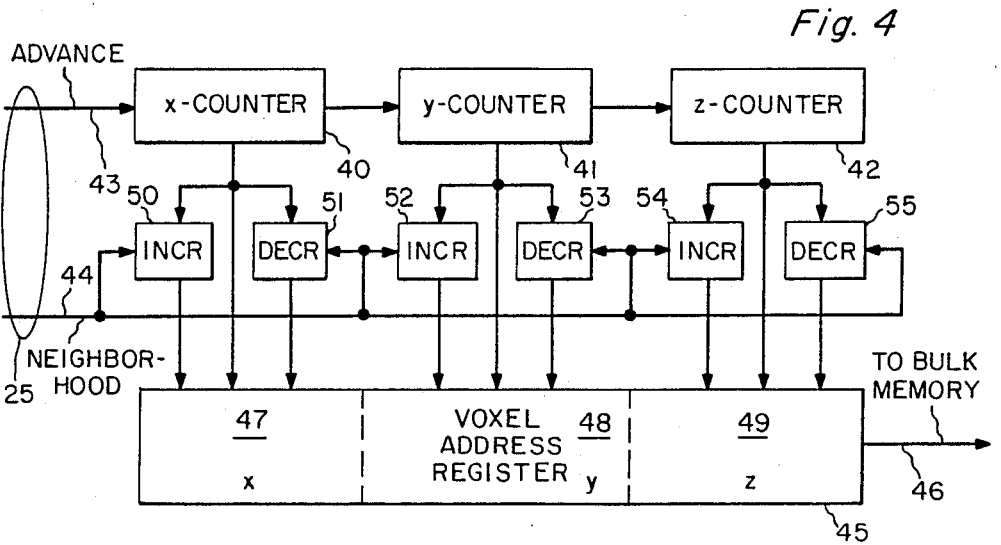
FIG. 4 is a detailed circuit diagram of a voxel address generator circuit useful in the processing system of FIG. 3.

FIG. 4 shows a detailed circuit diagram of address generator 22 of FIG. 3, wherein the address generator comprises an x-counter 40, a y-counter 41 and a z-counter 42. Each counter counts up to the total number of voxels in the corresponding dimension of the array of data values. Moreover, x-counter 40 advances y-counter 41 each time counter 40 recycles, and y-counter 41 advances z-counter 42 each time counter 41 recycles. The counts in counters 40-42 are stored in a voxel address register 45 in sections 47, 48 and 49, respectively, one for each of counters 40-42. Together, these three counts form an address in bulk memory 20, shown in FIG. 3, which address accesses all eight of the vertex values V1-V8 for the voxel identified by the contents of register 45. Bulk memory 20 may, for example, comprise eight banks of storage elements, each of which stores a voxel vertex value at each address. The values stored in identical addresses of the different banks of memory 20 are, of course, the eight vertex values for the same voxel. A single address therefore can serve to simultaneously access the eight voxel vertex values. An advance pulse on lead 43 (from compare circuit 26 of FIG. 3) advances counters 40-42 to the next voxel address, accessing the eight voxel vertex values for the next voxel.

If it is determined that the surface of interest intersects the voxel identified by the address in register 45 (by means of compare circuit 26 in FIG. 3), lead 44 is energized to cyclically enable increment and decrement circuits 50-55. By systematically incrementing and decrementing the counts in counters 40-42, the near neighborhood voxels are identified by the successive addresses in register 45. These near neighbor voxel addresses serve to retrieve the corresponding voxel vertex values from bulk memory 20. The W1-W24 (shown in FIG. 2) near neighbor values are thereby made available for storage in neighborhood register 23 in FIG. 3. More particularly, if the counts in y-counter 41 and z-counter 42 are held constant and the count in x-counter 40 is incremented by one, the voxel V1-V2-V5-V6-W5-W6-W13-W14 (FIG. 2) is accessed and the values W5, W6, W13 and W14 can be stored in register 23 (shown in FIG. 3). If the count in x-counter 40 is then decremented by one, the voxel V3-V4-V7-V8-W9-W10-W17-W18 is accessed and the near neighbor values W9, W10, W17 and W18 can be stored in register 23. Similarly, holding other pairs of counters 40-42 constant and incrementing and decrementing the third counter serves to access the voxels with all of the other neighborhood values W1-W24 for storage in register 23.

It is readily apparent that the counts in counters 40-42 can be arbitrarily limited to preselected ranges of values (by means of obvious circuit modifications) to thereby scan only a restricted volume of the data space. If it is known that the surface of interest, or the desired portion of the surface of interest, is restricted to a predetermined volume of the data space, then it is economical in processing time to process only those voxels lying within that restricted space. If the volume of interest is not known beforehand, then, of course, it is possible to restrict the data displayed once the desired volume is known. A technique for such later restriction will be discussed in conjunction with FIG. 10.

Figure 5:
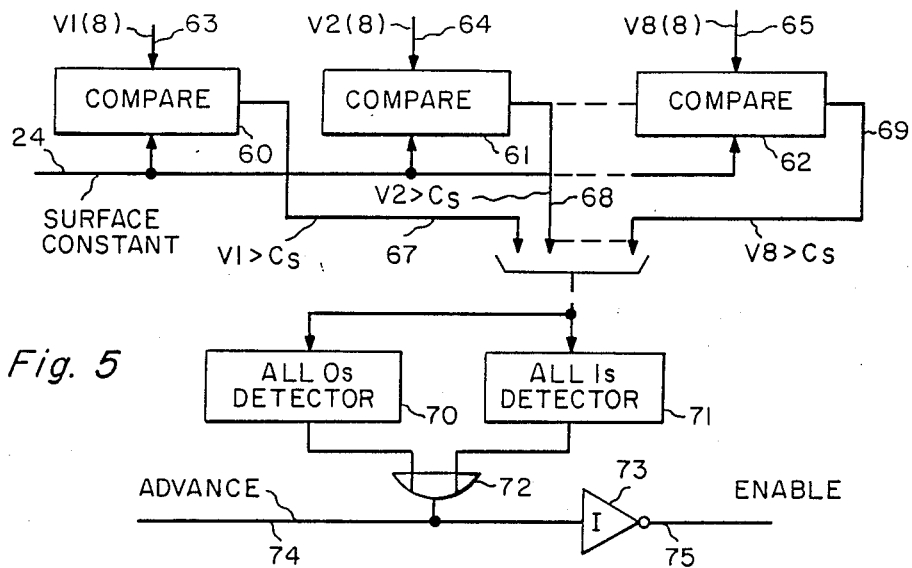
FIG. 5 is a detailed circuit diagram of an eight-value compare circuit useful in the processing system of FIG. 3.

FIG. 5 is a detailed circuit implementation of the 8-value compare circuit 26 of FIG. 3. The circuit of FIG. 5 is used to compare both voxel vertex values from voxel register 21 and sub-voxel vertex values from interpolator circuit 35 with the surface constant on leads 24 (FIG. 3). A single comparator can be used for both of these functions since sub-voxel comparisons need only occur after a voxel comparison indicates intersection with that voxel. As an alternative, a separate sub-voxel comparator can be used to search the sub-voxels of intersecting voxels while the other comparator is searching for the next intersecting voxel. For this purpose, the comparator circuit of FIG. 5 is simply duplicated.

The comparison circuit of FIG. 5 comprises eight parallel compare circuits 60, 61, . . . , 62. Each of circuits 60-62 is capable of comparing a multidigit voxel vertex value (on sets of leads 63-65) to the surface constant value on leads 24, and of producing an output signal on one of eight output leads 67-69 if, and only if, the corresponding vertex value is greater than the surface constant. These eight output signals are simultaneously delivered to an all-0s detector 70 and an all-1s detector 71. Outputs from detectors 70 and 71 are combined in an OR gate 72, the output of which is coupled to lead 74 to advance address generator 22 of FIG. 3 only while comparing voxels and hot sub-voxels (for voxel vertex comparisons) and voxel subdivider 29 of FIG. 3 (for sub-voxel vertex comparisons). The output signal of OR gate 72 is also applied to an inverter circuit 73, the output signal of which, on lead 75, is used to enable normal calculator 27 of FIG. 3 (for voxel vertex comparisons) and to gate the output of normal interpolator circuit 31 of FIG. 3 (for sub-voxel vertex comparisons).

Figure 6:
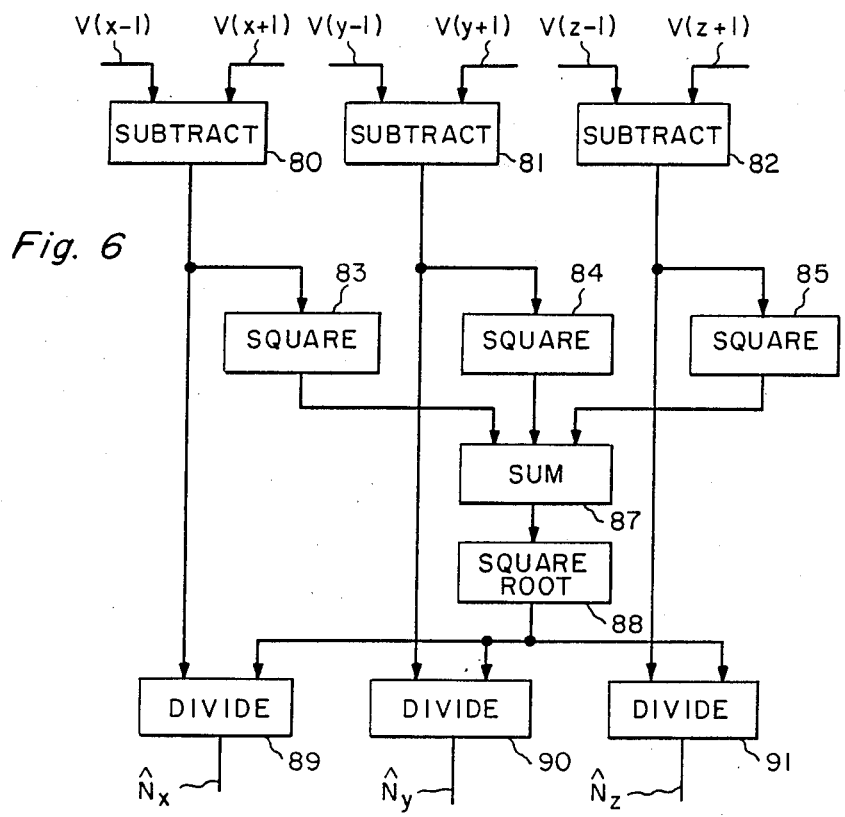
FIG. 6 is a detailed circuit diagram of a normal vector calculator for determining the value of surface normals, and which is also useful in the processing system of FIG. 3.

FIG. 6 is a detailed circuit diagram of normal calculator 27 of FIG. 3. As can best be seen in FIG. 2, the normal (or N) values are calculated simply by determining the data value gradient at the voxel vertex. That is, the values at the immediately adjacent vertices (along each axis) are subtracted to provide an approximation of the necessary gradient. More specifically, $$\begin{aligned} N(V1_x) &= W5 - V4 \\ N(V1_y) &= W12 - V2 \\ N(V1_z) &= W1 - V5 \\ N(V2_x) &= W6 - V3 \\ N(V2_y) &= V1 - W7 \\ N(V2_z) &= W2 - V6 \end{aligned} \quad (1)$$

and so forth for V3–V8 in FIG. 2. Since only the directions of the normal vectors, and not their magnitudes, are of interest, the values thus obtained are normalized by letting $$D = \sqrt{N(V1_x)^2 + N(V1_y)^2 + N(V1_z)^2} \quad (2)$$

and $$N(V1_x) = \frac{N(V1_x)}{D}$$

$$N(V1_y) = \frac{N(V1_y)}{D}$$

$$N(V1_z) = \frac{N(V1_z)}{D}$$

where the Ns are the unit value normal vectors at the voxel vertices. That is, N is a unit vector in the angular direction of the normal vector. These normal unit vector values are stored in normal register 28, shown in FIG. 3, for later use in interpolating normal values inside of the voxel. The circuit of FIG. 6 carries out the procedures of equations (1) and (2) in a straightforward fashion. However, the circuit of FIG. 6 will generate normals for only one voxel vertex value, so that it is therefore necessary to provide eight circuits like FIG. 6 to generate the eight voxel vertex normal values simultaneously.

For each voxel vertex x, y, z, the immediately adjacent straddling vertex values in the x-direction are applied to a subtractor circuit 80 of FIG. 6. Similarly, the adjacent straddling y-values are applied to a subtractor 81 and the adjacent straddling z-values are applied to a subtractor 82. The differences obtained in subtractors 80–82 are applied to squaring circuits 83–85, respectively, the output signals of which are summed in a summing circuit 87. The output signal of summing circuit 87 is applied to a square root circuit 88, the output signal of which is simultaneously applied to dividing circuits 89–91. The other input to divide circuit 89 receives the output signal of subtractor 80 while the other input signals to divide circuits 90 and 91 are taken from subtractors 81 and 82, respectively. The output signals of divide circuits 89–91 are the unit normal vectors to be stored in normal register 28 of FIG. 3.

Figure 7:
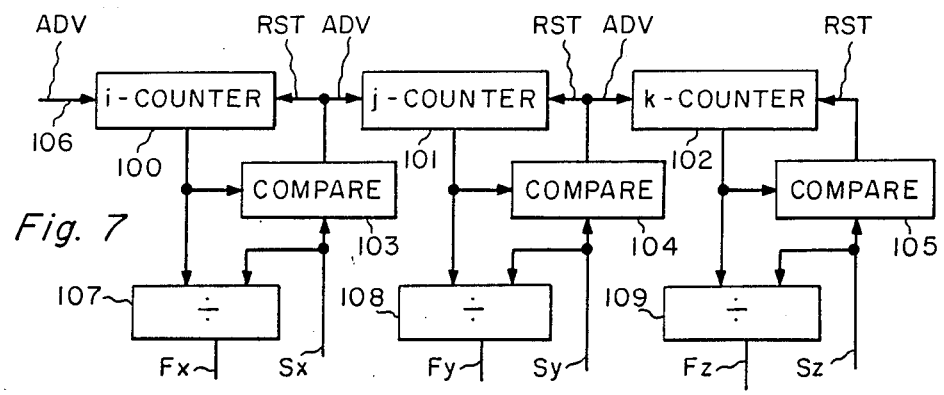
FIG. 7 is a detailed block diagram of a voxel subdivider circuit useful in the processing system of FIG. 3.

FIG. 7 is a detailed circuit diagram of voxel subdivider circuit 29 of FIG. 3. In general, the voxel subdivider of FIG. 3 systematically generates the sub-voxel fractional coordinates within the voxel intersecting the surface of interest. As shown in FIG. 7, the voxel subdivider comprises an i-counter 100, a j-counter 101 and a k-counter 102. These three counters operate similarly to counters 40–42 of FIG. 4, sequentially identifying sub-voxels in response to advance pulses on lead 106. The scaling constants $S_x$, $S_y$, $S_z$ are applied to compare circuits 103, 104 and 105, respectively, and therein compared to the counts in counters 100, 101 and 102, respectively. When a match occurs, the corresponding counter is reset and the following counter is advanced by one. Thus counters 100–102 each count modulo-$S_n$. As noted above, the scaling factors can be the same in all three dimensions, or in any two of the dimensions, depending on the dimensions of the data space and the resolution capability of the display device system.

The output signals of counters 100, 101 and 102 are applied to divider circuits 107, 108 and 109, respectively, to which the corresponding one of scaling constants $S_x$, $S_y$, $S_z$ is also applied. The output signals of divider circuits 107–109 are a set of fractional voxel coordinates Fx, Fy and Fz given by $$\begin{aligned} Fx &= i/S_x \quad i = 0, 1, \ldots, S_x \\ Fy &= j/S_y \quad j = 0, 1, \ldots, S_y \\ Fz &= k/S_z \quad k = 0, 1, \ldots, S_z \end{aligned} \quad (3)$$

The voxel interpolator 35 (FIG. 3) and normal interpolator 31 (FIG. 3) utilize the Fx, Fy and Fz fractional voxel parameters to perform a three-dimensional interpolation between the voxel vertex data values and between the voxel vertex normal values. It will be noted that if the scaling factors $S_x$, $S_y$, $S_z$ are binary expansion values, i.e., $2^n$, the processing necessary in divide circuits 107–109 is greatly simplified, requiring only a repositioning of the binary point by n places to the left.

Figure 8:
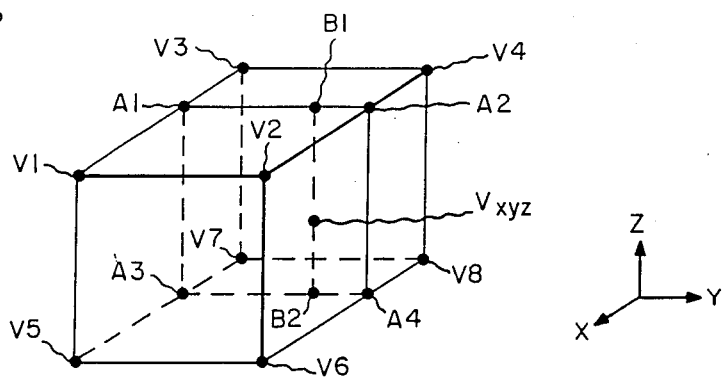
FIG. 8 is a perspective view of a voxel, illustrating the three-dimensional linear interpolation process useful in understanding the circuit of FIG. 9.

FIG. 8 is a perspective view of a single voxel which is useful in understanding the three-dimensional interpolation circuit of FIG. 9. The voxel illustrated in FIG. 8 has vertices V1–V8 as in FIG. 1. Given a fractional voxel coordinate Fx in the x-direction, the voxel edge points A1–A4 can be readily located at that fractional distance between the plane V1–V2–V5–V6 and the plane V3–V4–V7–V8. Similarly, the line B1–B2 can be located a fractional voxel distance Fy in the y-direction between line A1–A3 and line A2–A4. Finally, given a fractional voxel distance Fz in the z-direction, the interpolated value $V_{xyz}$ can be located along line B1–B2. Interpolator circuit 35 shown in FIG. 9 uses this three-dimensional interpolation technique to determine the data values at the vertices of the sub-voxels within a voxel intersecting the surface of interest. The interpolator circuit of FIG. 9 is also employed in interpolating the unit normal vectors at sub-voxel vertices of the sub-voxels found to intersect the surface of interest, as mentioned in conjunction with the description of FIG. 3.

Interpolator 35 of FIG. 9 carries out the three-dimensional interpolation illustrated in FIG. 8 in a straightforward manner. The interpolation of the voxel shown in FIG. 8 performed by interpolator 35 can be summarized as follows:

$$\begin{aligned} A1 &= V3 + Fx \, (V1 - V3) \\ A2 &= V4 + Fx \, (V2 - V4) \end{aligned} \quad (4)$$

-continued
$$A3 = V7 + Fx(V5 - V7)$$
$$A4 = V8 + Fx(V6 - V8)$$
$$B1 = A1 + Fy(A2 - A1)$$
$$B2 = A3 + Fy(A4 - A3)$$
$$V_{ijk} = B2 + Fz(B1 - B2)$$

Interpolator 35 includes seven subtractor circuits 112–118, seven adder circuits 119–125 and six multiplier circuits 126–132 connected together in an obvious manner to implement equations (4). The three fractional voxel values Fx, Fy and Fz, and the eight voxel vertex values V1 through V8, are applied to circuit 35 from the voxel subdivider 29, such as shown in FIG. 7, to derive the sub-voxel vertex value $V_{ijk}$. Since eight sub-voxel vertex values are required to test the sub-voxel for surface intersections, eight interpolator circuits 35, each being of the configuration shown in FIG. 9, are provided, with each circuit 35 being driven by a different voxel subdivider such as that shown in FIG. 7, but being offset from each other in the i, j and k counts so as to identify the other sub-voxel vertices of the same sub-voxel. Alternatively, a single set of sub-voxel counters can be used, with the offsets being provided by incrementing circuits and decrementing circuits similar to those shown in FIG. 4.

The interpolated sub-voxel unit normal vectors from the interpolator circuits of FIG. 9 are delivered to display system 34 (FIG. 3) simultaneously with a set of coordinates from voxel subdivider 29 identifying the sub-voxel intersected by the surface having that normal vector. If, as proposed above, the scaling factors $S_x$, $S_y$, $S_z$ are binary $2^n$ values, then the address of the sub-voxel is simply the juxtaposition of the voxel address in register 45 of FIG. 4 as the most significant digits and the sub-voxel address in counters 100–102 of FIG. 7 as the least significant digits. While the coordinates of the surface normal unit vector is most accurately assumed to be at the exact geometric center of the intersected sub-voxel, any one of the already available sub-voxel vertex coordinates will do just as well since a constant offset for all of the normal unit vectors will not alter the resulting image whatsoever.

Figure 10:
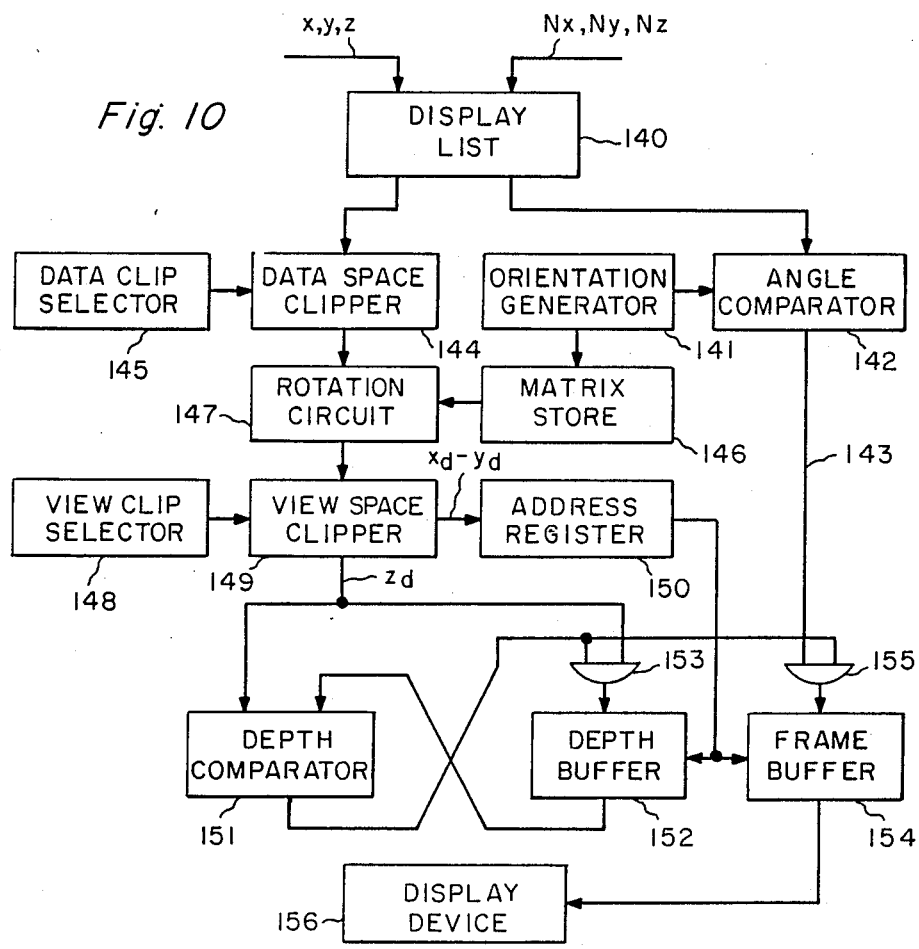
FIG. 10 is a detailed block diagram of a display processor which is also useful in the processing system of FIG. 3.

FIG. 10 is a detailed block diagram of display system 34 of FIG. 3. The display system, as shown in FIG. 10, comprises a display list storage circuit 140 into which are stored the x-y-z coordinates of all of the sub-voxels intersected by the surface of interest, along with the normal unit vector components Nx-Ny-Nz associated with each of those coordinates. Since the time required to derive all of the coordinate-normal pairs is independent of the time required to process these pairs for display, display list 140 acts as a first-in, first-out (FIFO) buffer store for the coordinate-normal pairs. When the first coordinate-normal pair becomes available in list 140, the normal unit vector components are supplied to an angle comparator 142, to which is also supplied a viewing angle from an orientation generator 141. Comparator 142 generates a signal proportional to the dot product between the normal vector and the viewing direction, and outputs this signal as a pixel intensity or pixel color signal on lead 143.

At the same time that the normal unit vector is supplied to comparator 142, the x, y and z coordinates of the intersection point are supplied to a data spacer clipper 144. A data clip selector 145 selects six cutting planes which define a volume of the data space to be used for the display. Since the volume of interest is most likely smaller than the entire data space, considerable processing time can be saved by restricting the dimensions of the data space processed. In its simplest form, data clip selector 145 selects coordinate intervals on the x, y and z axes and data space clipper 144 excludes all intersection points not falling within these intervals. This can be accomplished very rapidly simply by comparing all of the data coordinates to all of the clip coordinates in parallel. Careful selection of the data space clipping planes can result in intersections with the surface of interest, thereby providing visual cross sections through the surface of interest.

Given surface points on the three-dimensional surface contained in the three-dimensional data space, it is then necessary to convert these surface points into display points for display on a two-dimensional display. This is accomplished by projecting the data points onto a display plane by matrix rotation and translation. More specifically, the x, y and z components of the surface point can be rotated and translated by the vector $x_o$, $y_o$, $z_o$ into the display points $x_d$, $y_d$ and $z_d$ by the following well-known matrix operations:

$$\begin{aligned} x_d &= M_{11}x + M_{12}y + M_{13}z + x_o \\ y_d &= M_{21}x + M_{22}y + M_{23}z + y_o \\ z_d &= M_{31}x + M_{32}y + M_{33}z + z_o. \end{aligned} \quad (5)$$

In the apparatus of FIG. 10, all of the possible matrix coefficients $M_{ij}$ of equation (5) are stored in matrix store 146 and the particular ones to be used for the desired display orientation are selected by the orientation generator 141.

The output of a rotation circuit 147 is a series of displayable coordinates $x_d$, $y_d$ and $z_d$. These displayable points can again be decimated by a view space clipper circuit 149, under the control of a view clip selector 148. As in the case of data clip selector 145, six clipping planes are selected by selector 148 to limit the view displayed to a selected portion of the display data, i.e., a display window. The result is a doubly decimated series of displayable points, including coordinates from clipper 149 and pixel intensities (colors) from comparator 142 on lead 143. It will be noted, however, that the surface of interest may have more than one point rotated into the display plane at the same $x_d$ and $y_d$ coordinates, due to the convolutions of the surface in physical space and the selected viewing angle. In order to display the surface accurately, the surface point closest to the viewer must be selected in preference to the surface point further away (and thus hidden by) the closest surface point. In order to resolve this ambiguity, a depth buffer store 152 is provided.

In operation, depth buffer 152 is initialized by loading the maximum possible depth into all of the storage addresses of buffer 152. Then the $x_d$ and $y_d$ coordinates from view space clipper 149 are applied to an address register 150. The address in register 150 is used to address both depth buffer 152 and a frame buffer 154. Frame buffer 154 contains the display intensity (or color) information for each displayable point (pixel) in the display, at the storage address corresponding to the coordinates of the corresponding point on the display. The $z_d$ depth coordinate from clipper 149 is applied to depth buffer 152, via an AND gate 153, and to a depth comparator 151. Depth buffer 152, like frame buffer 154, contains information at addresses corresponding to each displayable point, but contains depth information rather than intensity information. As noted above, the initial value at all of the addresses is the maximum possible depth value, e.g., the maximum dimension of the data space. Comparator 151 determines whether or not a new $z_d$ value at the same $x_d$ and $y_d$ coordinates as a previously stored $z_d$ value is smaller (i.e., closer to the display plane) than the previously stored $z_d$ value. If so, the new depth value is stored in depth buffer 152 by enabling AND gate 153 with the output signal of comparator 151. At the same time, the new intensity data from comparator 142 overwrites the old intensity data in frame buffer 154 by enablement of an AND gate 155. In this way, the contents of frame buffer 154, after all of the display points of display list 140 are exhausted, consists only of the display points closest to the viewing plane. The contents of frame buffer 154 are used to refresh the displayed image on a display device (e.g., a cathode ray tube) 156. It should be noted that initializing depth buffer 152 to the maximum depth value insures that the first depth value received from clipper 149 overwrites the maximum depth by enabling comparator 151.

In FIG. 10, the transformation, including data space clip selector 145, data space clipper 144, orientation generator 141, angle comparator 142, matrix selector 148, and address register 150 were implemented by using a bit-serial silicon compiler to design a VLSI 1.25 micron CMOS chip. The resulting chip transforms points at a rate of 937,500 points per second to provide an interactive three-dimensional display. A printed circuit board was constructed according to FIG. 10 and yielded high quality three-dimensional images of medical objects using a Sun workstation.

It can be seen that the highly parallel, pipeline architecture of the solid body internal structure display processor described above permits very rapid generation of the visual images. Moreover, the various parallel processing circuits can be readily fabricated in large scale integrated circuit chips to reduce the size and cost of such processing circuits while, at the same time, improving the operating speed and reliability of these circuits.

Figure 11:
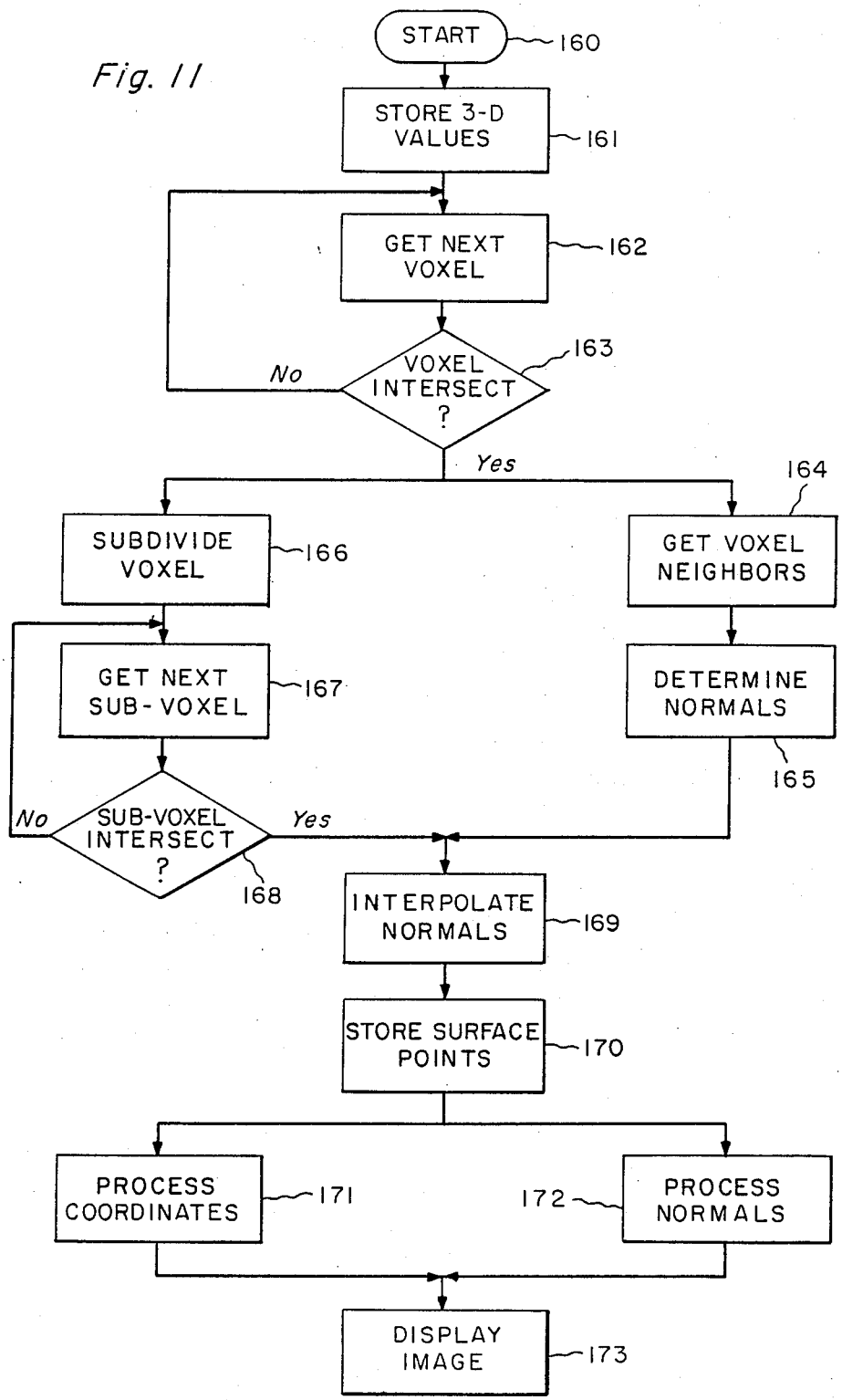
FIG. 11 is a flowchart of the process taking place in the system of the present invention.

The process carried out by the apparatus of FIG. 3 of the drawings can be represented by the flow chart of FIG. 11. Starting at start box 160, the three-dimensional array of physical values is stored in a highly parallel, bulk memory from which it can be accessed in parallel, one voxel at a time. At box 162, the eight voxel vertex data values for the next voxel are accessed from the bulk memory and passed on to decision box 163. If the surface of interest does not intersect this voxel, decision box 162 is reentered to retrieve the next voxel. If the surface of interest does intersect this voxel, boxes 164 and 166 are simultaneously entered. At box 164, the near neighbor voxels are accessed and the neighbor voxel vertex values used at box 165 to determine a normal unit vector for each voxel vertex. At box 166, the intersected voxel is subdivided and, at box 167, the eight sub-voxel vertex values for the next sub-voxel of the subdivided voxel are interpolated from the voxel vertex values obtained at box 162. At decision box 168, the sub-voxel vertex values are tested for intersections with the surface of interest. If no intersection is found, box 167 is re-entered to determine the sub-voxel vertex values for the next sub-voxel. If a sub-voxel intersection is detected at decision box 168, the sub-voxel coordinates are used to interpolate a unit normal vector at the sub-voxel coordinates, at box 169. At box 170, the sub-voxel coordinates and the sub-voxel unit normal vector pairs are stored. The coordinates are processed at box 171 to select the viewing orientation, to decimate the data in the space of the data and in the space of the viewer, and to rotate and translate the decimated coordinates into the selected viewing plane. The surface normal unit vectors are processed at box 172 to derive color or intensity information by comparing the normal vector angle to the angle of view. At box 173, the resulting pixel color or pixel intensity is displayed at the display coordinates provided by box 171.

It should be clear to those skilled in the art that further embodiments of the present invention may be made by those skilled in the art without departing from the spirit or scope of the present invention.

What is claimed is:

1. A system for displaying two-dimensional images of internal surfaces of three-dimensional solid bodies, comprising:
    means for storing three-dimensional signal patterns representing the value of at least one physical property associated with a three-dimensional body at regularly spaced grid locations defining volume voxel elements within said body;
    means for selectively accessing an entire voxel of values, represented by said signal patterns, from said storing means at one time;
    parallel circuit means for testing said voxel values, as defined by vertex values, for intersections of said voxel with a preselected internal surface of said three-dimensional body;
    parallel circuit means for subdividing only intersected voxels into sub-voxels;
    parallel circuit means for testing values of each of said sub-voxels for intersections of said each sub-voxel with said preselected surface;
    parallel circuit means for determining sub-voxel normal values only for those sub-voxels intersected by said preselected surface; and
    display processor means for receiving sub-voxel coordinates and sub-voxel normal values, and for displaying said normal values on a screen, said displayed values representing an image of said preselected surface.

2. The system according to claim 1 further comprising:
    means for simultaneously accessing a plurality of neighborhood voxel values for those voxels having a common face with the accessed entire voxel; and
    parallel circuit means, utilizing said neighborhood voxel values, for determining surface normal vectors by central differences.

3. The system according to claim 1 wherein said parallel circuit means for testing said voxel values comprises:
    means for simultaneously comparing all of said vertex values to a constant value representing said preselected surface; and
    means for detecting when said constant value lies between a maximum and a minimum of said vertex values.

4. The system according to claim 1 wherein said parallel circuit means for subdividing only intersected voxels into sub-voxels comprises:
    parallel circuit means utilizing voxel scaling factors to generate sub-voxel fractional addresses within a voxel,
    said scaling factors being different for each dimension of said regularly spaced grid.

5. The system according to claim 4 wherein at least one of said scaling factors is given by $2^n$, where n is an integer.

6. The system according to claim 1 wherein said parallel circuit means for subdividing only intersected voxels into sub-voxels comprises:
parallel circuit means utilizing voxel scaling factors to generate sub-voxel fractional addresses within a voxel,
said scaling factors being the same for at least two dimensions of said regularly spaced grid.

7. The system according to claim 6 wherein at least one of said scaling factors is given by $2^n$, where n is an integer.

8. The system according to claim 1 wherein said display processor means comprises:
means for comparing said sub-voxel normal values to a viewing angle to produce a pixel value for said image of said preselected surface;
means for transforming the coordinates of said normal values into coordinates on a viewing plane for said image of said preselected surface;
means for limiting the coordinates included in said image of said preselected surface; and
means for resolving ambiguities between display surface pixels occupying the same pixel locations.

9. The system according to claim 8 wherein said means for limiting the coordinates included in said image of said preselected surface comprises:
means for decimating said sub-voxel normal values in the space of said signal patterns.

10. The system according to claim 8 wherein said means for limiting the coordinates included in said image of said preselected surface comprises:
means for decimating said sub-voxel normal values in the space of said viewing plane.

11. A method for displaying two-dimensional images of internal surfaces of three-dimensional solid bodies, comprising:
storing three-dimensional signal patterns representing the value of at least one physical property associated with a three-dimensional body at regularly spaced grid locations defining volume voxel elements within said body;
selectively accessing an entire voxel of said values, represented by signal patterns, from said storing means at one time;
testing a plurality of said voxel values, as defined by said vertex values, in parallel for intersections of said voxel with a preselected internal surface of said three-dimensional body;
subdividing only intersected ones of said voxels into a plurality of sub-voxels in parallel;
testing values of each of said sub-voxels, simultaneously and in parallel, for intersections of said each sub-voxel with said preselected surface;
determining sub-voxel normal values in parallel only for those sub-voxels intersected by said preselected surface; and
displaying said normal values such that said values being displayed represent an image of said preselected surface.

12. The method according to claim 11 further comprising:
simultaneously accessing a plurality of neighborhood voxel values for those voxels having a common face with the accessed entire voxel; and
utilizing said neighborhood voxel values to determine, in parallel, all of the voxel vertex surface normal vectors by central differences.

13. The method according to claim 11 wherein the step of testing comprises:
simultaneously comparing all of said vertex values to a constant value representing said preselected surface; and
detecting when said constant value lies between a maximum and a minimum of said vertex values.

14. The method according to claim 11 wherein the step of subdividing comprises:
utilizing voxel scaling factors to generate in parallel a plurality of sub-voxel fractional addresses within a voxel,
said scaling factors being different for each dimension of said regularly spaced grid.

15. The method according to claim 14 wherein at least one of said scaling factors is given by $2^n$, where n is an integer.

16. The method according to claim 11 wherein the step of subdividing comprises:
utilizing voxel scaling factors to generate in parallel a plurality of sub-voxel fractional addresses within a voxel,
said scaling factors being the same for at least two dimensions of said regularly spaced grid.

17. The method according to claim 16 wherein at least one of said scaling factors is given by $2^n$, where n is an integer.

18. The method according to claim 11 wherein the step of displaying further comprises:
comparing said sub-voxel normal values to a viewing direction to produce a pixel value for said image of said preselected surface;
transforming the coordinates of said surface points into coordinates on a viewing plane for said image of said preselected surface;
limiting the coordinates included in said image of said preselected surface; and
resolving ambiguities between display surface pixels occupying the same pixel locations.

19. The method according to claim 18 wherein the step of limiting further comprises:
decimating said sub-voxel normal values in the space of said signal patterns.

20. The method according to claim 18 wherein the step of limiting comprises:
decimating said sub-voxel normal values in the space of said viewing plane.

21. A processing system of pipeline circuit architecture for rapidly displaying a two-dimensional image of a three-dimensional data array comprising:
a first circuit of pipeline configuration responsive to data values in said array, for simultaneously locating the position of a plurality of points on a surface of interest in said data array; and
a second circuit of pipeline configuration in parallel with said first circuit of pipeline configuration, also responsive to said data values, for simultaneously establishing intensity of the displayed image at said plurality of points.

22. The processing system according to claim 21 wherein said first and second pipeline circuit means comprise large scale integrated circuit chips.

* * * * *